Aug. 18, 1936.    C. P. KOTTLOWSKI ET AL    2,051,488
CHAIN TIGHTENER
Filed July 16, 1932
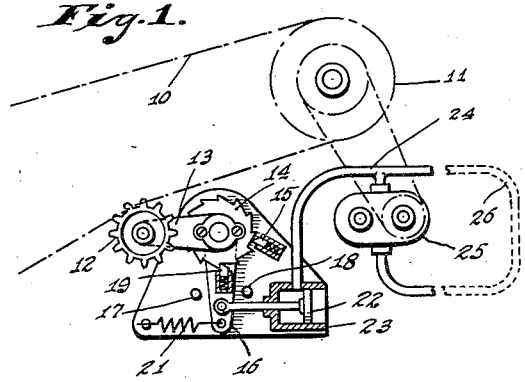
Fig. 1.
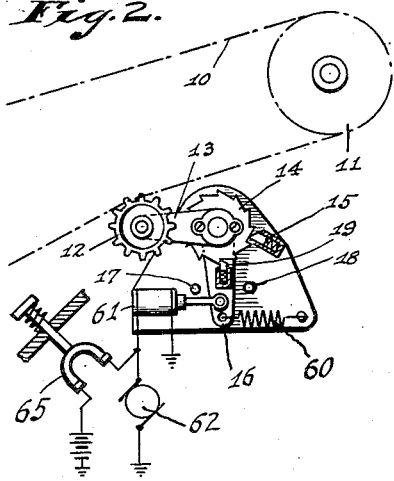
Fig. 2.
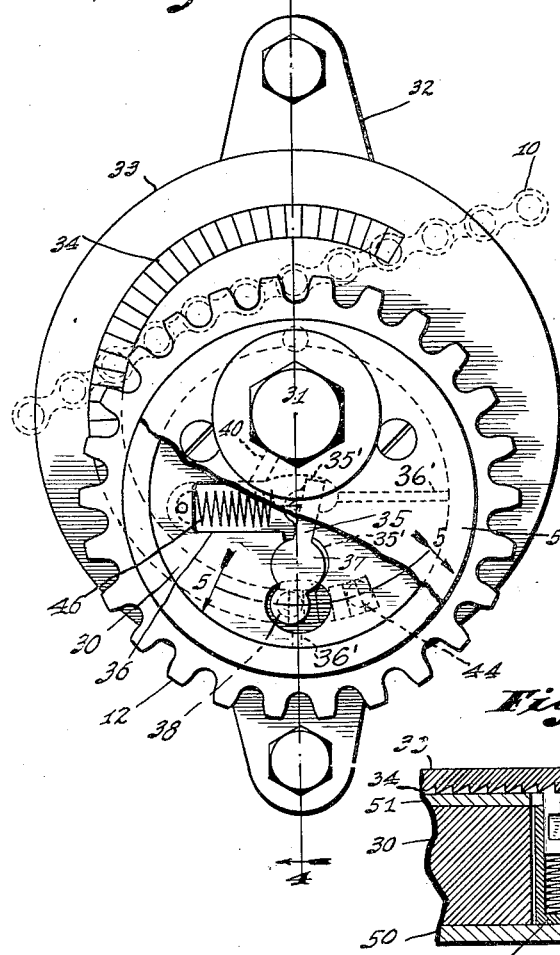
Fig. 3.
Fig. 5.
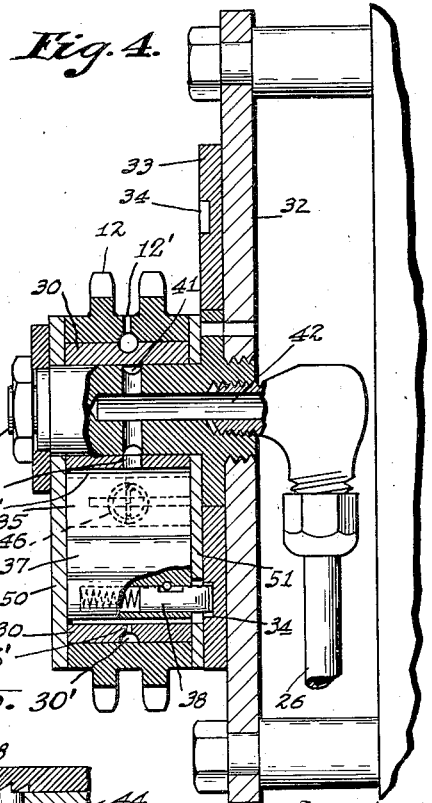
Fig. 4.
Inventors
CLARENCE P. KOTTLOWSKI and
CLIFFORD C. DREYER,
Attorneys Patented Aug. 18, 1936

2,051,488

UNITED STATES PATENT OFFICE 2,051,488

CHAIN TIGHTENER

Clarence P. Kottlowski and Clifford C. Dreyer, Indianapolis, Ind., assignors to Diamond Chain and Manufacturing Company, Indianapolis, Ind., a corporation of Indiana Application July 16, 1932, Serial No. 622,977

12 Claims. (Cl. 74—242.11)

Our invention is concerned with devices for adjusting chain drives to produce the proper amount of tension in the chain by taking up slack, and it is our object to produce a chain-tensioning device which will operate automatically and which will not possess undesirable features of prior chain-tensioning devices of which we are aware. More specifically, it is our object to produce an automatic chain-tensioning device which will not impose an undue load on the chain and which therefore will eliminate excessive wear and be conducive to long life of the chain.

In carrying out our invention, instead of employing an idler sprocket which is continuously forced against the chain by some yielding means, as prior inventors have done, we employ an idler sprocket which is forced against the chain only intermittently, and preferably only at times when the chain is idle or is at least running at less than normal speed; and we provide a ratchet device for preventing more than a predetermined movement of the idler sprocket away from the chain when the tightening pressure is relieved.

The accompanying drawing illustrates our invention: Fig. 1 is a diagrammatic view illustrating the principle of our invention; Fig. 2 is a view similar to Fig. 1 illustrating a modified means which we may employ to control the chain-tightener; Fig. 3 is an elevation of a practical embodiment of our invention; Fig. 4 is a vertical section on the line 4—4 of Fig. 3; and Fig. 5 is a development of a section on the line 5—5 of Fig. 3.

In Fig. 1 of the drawing we have illustrated a chain 10 and one of the sprockets 11 associated therewith in a chain drive. The idler sprocket 12, which is employed to tighten the chain, preferably co-operates with a stretch thereof which is slack under running conditions. The sprocket 12 is mounted so that it may be moved generally transversely of the stretch of chain with which it co-operates in order to maintain the chain at approximately the correct degree of tightness. For this purpose, the sprocket 12 is shown as mounted on an arm 13 pivoted on a stationary axis.

We have shown rigid with the arm 13 a ratchet wheel 14 with which there co-operates a pawl 15 mounted on some convenient stationary part and serving to limit movement of the sprocket 12 away from the adjacent stretch of the chain 10.

In Fig. 1, there is also illustrated a swinging lever 16 oscillatable about an axis concentric with that of the arm 13 and limited in its swinging movement by stop pins 17 and 18. A pawl 19 mounted on the lever 16 in position to co-operate with the ratchet 14 serves to move the sprocket 12 toward engagement with the chain 10 as the lever 16 is oscillated between the limits of movement provided by the pins 17 and 18. A spring 21 acting on the lever 16 tends to move it in the direction which causes the sprocket 12 to approach the chain 10.

If the spring 21 were connected with the arm 13 directly rather than through the medium of the ratchet mechanism illustrated, the construction so far described would be generally typical of prior chain-tightening devices of which we are aware, and the spring 21 would operate to maintain a constant effort forcing the sprocket 12 into engagement with its associated stretch of the chain 10, thus imposing on the chain an unnecessary load promoting rapid wear and short life. By our invention, we provide means for relieving the chain from the effort exerted by the spring 21 when the chain is operating under normal conditions.

If the mechanism associated with the chain drive includes a positive-pressure lubricating system, for example, we may employ the pressure existing in the lubricating system for the purpose of relieving the force tending to move the sprocket 12 against its associated stretch of chain. To this end, we may connect the arm 16 with a piston 22 which is slidably mounted in a cylinder 23. The cylinder 23 is connected, as through a tube 24, with the discharge opening of the oil pump 25 in the lubricating system 26.

In Fig. 1 the device is illustrated with the parts in the positions they respectively occupy when the chain-drive is not operating. In this condition, the spring 21 acting through the lever 16, pawl 19, and ratchet 14, is forcing the sprocket 12 against its associated stretch of chain, and is opposed by the tension in the chain. When the chain-drive is placed in operation, fluid pressure built up by the pump 25 would be communicated to the cylinder 23 and would force the piston 22 therein to the right. This movement of the piston would swing the lever 16 in a counterclockwise direction and would permit the sprocket 12 to move in a direction away from its associated stretch of chain, this movement being limited by engagement of the pawl 15 with the ratchet 14. The tension produced in the chain by the idler 12 is therefore slightly less when the chain-drive is operating than it is when the drive is idle, and the chain is thus relieved of undue stresses, wear is reduced, and the working life of all parts is prolonged.

When the chain-drive ceases operating, the pressure in the cylinder 23 drops, and the spring 21 again swings the lever 16 in a clockwise direction, the pawl 19 engaging the ratchet 14 causing the sprocket 12 to move toward the chain 10. As the chain wears, the spring 21 moves the lever 16 farther and farther in the clockwise direction until eventually the pawl 15 passes over one tooth of the ratchet 14 and prevents the sprocket 13 from being retracted through as great a distance as before.

Obviously, the spacing of the ratchet teeth should be such that the greatest possible movement of the sprocket 12 which can result from fluid-pressure in the cylinder 23 will be insufficient to produce an undesirable looseness in the chain.

The device illustrated in Fig. 1 and described above is included in this application largely as an example and for the purpose of illustration. A practical development of the invention is illustrated in Figs. 3, 4, and 5, which show a chain-tensioning device in association with the chain driving the camshaft of an internal combustion engine. In the arrangement illustrated in those figures of the drawing, the sprocket 12 is mounted for rotation upon a cylindrical bushing 30 which is eccentrically pivoted on a pivot bolt 31. This pivot bolt 31 is mounted on a bracket 32 secured to the engine block in such a position that the sprocket 12 will co-operate with the normally slack stretch of the chain 10. Also mounted upon the bracket 32 is a ratchet plate 33 having an arcuate series of ratchet teeth 34 concentric with the pivot bolt 31.

The bushing 30 is provided with an irregularly shaped cavity in which there is mounted a swinging vane 35. At one side of the vane 35, the cavity in the bushing 30 is provided with an extension 36 which serves as a fluid-pressure chamber. The vane 35 is formed to provide a generally cylindrical enlargement 37 that serves as a trunnion for swinging movement of the vane, the walls of the cavity in the bushing 30 having portions which conform to and support the enlargement 37. Below the enlargement 37, there is mounted for sliding movement in the plane of the vane a ratchet-pawl 38 spring-pressed into engagement with the ratchet teeth 34 of the plate 33.

The fluid-pressure chamber 36 communicates through a passage 40 with an annular groove 41 in the pivot bolt 31. This annular groove 31 in turn communicates with a passage 42 in the interior of the pivot bolt 31, such passage being connected to the lubricating system of the engine whereby oil under pressure will be supplied to the pressure chamber 36 when the engine is operating.

In addition to the cavity above described, the bushing 30 is provided with a cylindrical hole in which a locking pawl 44 is mounted, this pawl being spring-pressed into engagement with the ratchet teeth 34 in a manner similar to that of the pawl 38.

A coil-spring 46, or other yielding means, acts between the vane 35 and the bushing 30 and tends to move the vane toward the pressure-chamber 36.

Preferably, the cavity in the bushing 30 extends completely therethrough and is closed at its ends by cover plates 50 and 51 which may have a diameter greater than the bushing and which may overlap the hub of the sprocket 12 to retain it in place.

The device just described operates in a manner analogous to that illustrated in Fig. 1. When the engine is not operating, the spring 46 tends to swing the vane 35 in a counterclockwise direction about the axis provided by the enlargement 37. Because of the engagement of the pawl 38 with one of the ratchet teeth 34, this swinging movement of the vane relative to the bushing 30 tends to move the bushing itself in a clockwise direction about the axis of the pivot bolt 31, thus carrying the sprocket 12 toward the adjacent stretch of the chain 10 and causing the chain to be tightened. When the engine is started, the oil pressure built up in the lubricating system is communicated to the pressure chamber 36 and, acting on the vane 35, swings it in a clockwise direction relative to the bushing. This movement of the vane relieves the force which had previously tended to move the sprocket 12 toward the adjacent stretch of the chain 10 and permits the tension of the chain to move the sprocket backwardly through a distance limited by engagement of the pawl 38 with one of the ratchet teeth 34.

This cycle of operation is repeated every time the engine is started and stopped. If the chain is exceptionally loose when the tightener is first placed in operation, the vane 35 will swing through the entire range of movement permitted by the walls of the cavity in the bushing 30 and will advance the bushing 30 through an annular distance equal to the space between two ratchet teeth 34 for every cycle of operation. When, however, the chain becomes so tight that the spring 46 is unable to move the vane 35 to the counterclockwise limit of its movement relative to the bushing 30, the advance of the bushing at each starting and stopping of the chain ceases. As the chain lengthens, the spring 46 swings the vane 35 nearer and nearer to the counterclockwise limit of its movement in the bushing 30; and before the limit is reached, the pawl 44 engages behind another of the ratchet teeth 34 and prevents an excessive retraction of the sprocket.

In order that the oil in the pressure-chamber 36 may not interfere with the action of the spring in swinging the chain in a counterclockwise direction in the bushing, it is necessary to provide relief passages permitting the escape of such oil. This relief is afforded by clearances provided between the end of the swinging vane 35 and the adjacent arcuate wall of the cavity in the bushing 30 and also between the trunnion 37 and the supporting walls of the bushing-cavity. The clearances just referred to are indicated exaggeratedly at 35' in the drawing. The lower portion of the cavity in the bushing 30, and that portion of the cavity lying behind the vane 35 communicate with passages 36' leading to the peripheral wall of the bushing and opening in axial alinement with an annular groove 30' on such bushing wall, and in the plane of this groove the sprocket 12 is provided with one or more passages 12' which permit the oil escaping from the cavity in the bushing 30 to lubricate the sprocket and chain.

In the modification of our invention illustrated in Fig. 2, we have shown somewhat diagrammatically a chain-tightener which might be employed in an automobile having an engine equipped with an electric starter. This device is essentially the same as that shown in Fig. 1 except that the position of the arm 16 is controlled by a spring 60 and a solenoid 61 instead of by the spring 21 and fluid-pressure device illustrated in Fig. 1.

In the device shown in Fig. 2, the spring 60 differs from the spring 21 associated with the device illustrated in Fig. 1 in that it acts to swing the arm 16 in a counter-clockwise direction, thus tending to permit the sprocket 12 to be retracted from engagement with the adjacent stretch of the chain 10. The solenoid 61, which when energized tends to swing the arm 16 in a clockwise direction, is shown as connected in parallel with the starter motor 62 and therefore as under control of the starter switch 63 so that it will be energized whenever the starter switch 63 is closed and the starter 62 placed in operation.

In Fig. 2 the parts are shown in the positions they occupy when the switch 63 is closed and the engine is being cranked. Under such circumstances, the solenoid 61 is energized, thus tending to move the sprocket 12 toward the adjacent stretch of the chain 10 to the limit of movement in that direction which is provided by the tension of the chain 10. When the engine begins to run under its own power, the starter switch 63 will be opened and the solenoid 61 de-energized, and the spring 60 will swing the arm 16 in a counter-clockwise direction and permit the sprocket 12 to be retracted to the limit of movement provided by the ratchet-pawl 15. Upon each succeeding energization and de-energization of the solenoid 61, the arm 16 will be oscillated; and as the chain wears, the sprocket 12 will be moved farther and farther in the chain-tightening direction, until the ratchet-pawl 15 passes over another tooth.

It will be noted that the device illustrated in Fig. 2 differs from the other two devices shown in the drawing in that tightening movement of the idler sprocket 12 is effected when the chain is operating. However, this tightening movement of the sprocket 12 in the device illustrated in Fig. 2 occurs when the chain is running slowly, as it does when the engine is being cranked. In all devices illustrated, when the chain is running at normal speed the chain-tightening effort on the sprocket 12 is relieved.

The gist of our invention is this relief of chain-tightening effort when the chain is operating at normal speed. We have found this to be a distinct advantage, especially in chains adapted for high-speed operation; for under the conditions of high-speed operation, the slack stretch of the chain has a decided tendency to whip, and in devices where chain-tightening effort is continuously exerted, the idler sprocket is caused to follow the chain in its whipping and thereby to tighten it excessively.

In any device embodying our invention, the chain operates at normal speed with the idler sprocket relieved of any effort effective to move it in the chain-tightening direction. The tightening of the chain is effected when the chain is idle or when it is operating at low speed and not subject to whipping, and we thereby avoid excessive tightening of the chain.

We claim as our invention:

1. In combination with a chain drive, a sprocket movable into engagement with one stretch of the chain to tighten it, an oscillatable member, means operable upon movement of said member in one direction for moving said sprocket toward its associated chain-stretch, ratchet mechanism preventing greater than a predetermined movement of said sprocket in the opposite direction, a pump jointly operable with said chain drive, yielding means acting on said oscillatable member and tending to move it in that direction which will cause chain-tightening movement of said sprocket, and means responsive to fluid-pressure generated by said pump for moving said oscillatable member in the opposite direction.

2. In combination with a chain drive, a sprocket movable into engagement with one stretch of the chain to tighten it, an oscillatable member, means operable upon movement of said member in one direction for moving said sprocket toward its associated chain-stretch, ratchet mechanism preventing greater than a predetermined movement of said sprocket in the opposite direction, yielding means acting on said oscillatable member and tending to move it in that direction which will cause chain-tightening movement of said sprocket, and means operable jointly with said chain drive but independent of chain-tension for moving said oscillatable member in the opposite direction.

3. In combination with a chain drive, a sprocket movable into engagement with one stretch of the chain to tighten it, an oscillatable member, means operable upon movement of said member in one direction for moving said sprocket toward its associated chain-stretch, ratchet mechanism preventing greater than a predetermined movement of said sprocket in the opposite direction, and two means alternately operable independently of chain-tension for moving said oscillatable member in opposite directions, respectively.

4. In combination with a chain drive, a sprocket movable into engagement with one stretch of the chain to tighten it, yielding means acting on said sprocket and tending to produce chain-tightening movement thereof, ratchet mechanism for limiting movement of said sprocket in the opposite direction, and means operable jointly with said chain drive but independent of chain-tension and tending to move said sprocket in the last named direction.

5. A tightening device for the power-transmission chain of a chain drive, comprising a sprocket engaging the chain, a member upon which said sprocket is rotatably mounted, yielding means acting on said member tending to move it and said sprocket in a chain-tightening direction, means operative jointly with said chain drive but independent of chain-tension and tending to move said member and sprocket away from said chain to relieve the tension thereof, and a ratchet device associated with said member for limiting to a predetermined maximum the extent of such last mentioned sprocket movement.

6. A tightening device for the power-transmission chain of a chain drive, comprising a sprocket engaging the chain, a member upon which said sprocket is rotatably mounted, a spring, means operative jointly with the chain drive but independent of chain-tension for straining said spring, mechanism operated by said spring for moving said sprocket and member in a chain-tightening direction, and a ratchet device for limiting to a predetermined maximum movement of the sprocket and member in the opposite direction.

7. A tightening device for the power-transmission chain of a chain drive, comprising a sprocket engaging the chain, a member upon which said sprocket is rotatably mounted, an oscillatable element carried by said member, a stationary ratchet with which said oscillatable element co-operates to move, as the result of its oscillations, the member and sprocket in a chain-tightening direction, a pawl carried by said member and also co-operating with said ratchet to limit to a predetermined maximum any movement of said member and sprocket in the opposite direction, and two means alternately operable independently of chain-tension for moving said oscillatable member in opposite directions, respectively.

8. In combination with a chain drive, a sprocket movable into engagement with one stretch of the chain to tighten it, means tending to move said sprocket in the chain-tightening direction when the chain is not running at greater than a predetermined speed, means independent of chain-tension operative when said chain is running at greater than such predetermined speed and tending to move said sprocket in the opposite direction, and ratchet mechanism for limiting movement of said sprocket in the last named direction.

9. In combination with a chain drive having a positively interconnected chain and sprocket, a rotatable chain-tightening member movable into engagement with the chain to tighten it, means tending to force said member in the chain-tightening direction against the pressure exerted upon it by said chain, and mechanism jointly operable with said chain for preventing said means from producing chain-tightening movement of said member.

10. A chain tightener for a chain drive having a positively interconnected chain and sprocket, comprising a rotatable chain-engaging member, a support therefor, means mounting said support for chain-tightening movement, means acting on said support for applying a chain-tightening effort to said rotatable member, and mechanism associated with said chain-tightener and acting during normal operation of the chain drive for relieving said rotatable member of chain-tightening effort, said chain tightener including a device for limiting recession of said support under the influence of pressure exerted on said rotatable member by the chain.

11. In combination with a chain drive having a positively interconnected chain and sprocket, a rotatable chain-tightening member movable into engagement with the chain to tighten it, means tending to force said member in the chain-tightening direction against the pressure exerted upon it by said chain, and mechanism automatically responsive to operation of said chain for preventing said means from producing chain-tightening movement of said member.

12. In combination with a chain drive having a positively interconnected chain and sprocket, a chain-tightening device comprising a rotatable chain-tightening member movable into engagement with the chain to tighten it, means tending to force said member in the chain-tightening direction against the pressure exerted upon it by said chain, and mechanism associated with said chain-tightening device and acting during normal operation of the chain drive to prevent said means from producing chain-tightening movement of said member.

CLARENCE P. KOTTLOWSKI.
CLIFFORD C. DREYER.